United States Patent Office 2,822,351
Patented Feb. 4, 1958

2,822,351
POLYSULFONE CONDENSATION POLYMERS AND THE PREPARATION OF SAME

Algird Kreuchunas, Detroit, Mich.

No Drawing. Application December 5, 1955
Serial No. 550,805

6 Claims. (Cl. 260—79.3)

This invention relates to new thermoplastic polymers. More particularly the invention relates to polymers or resins derived from p,p'-dihalodiphenyl sulfones and p-phenylenedithiols.

The object of this invention is to provide new thermoplastic polymers or resins.

This object is obtained by reacting a p,p'-dihalodiphenyl sulfone with a p-phenylenedithiol under suitable conditions.

The resins of my invention conform to the formula

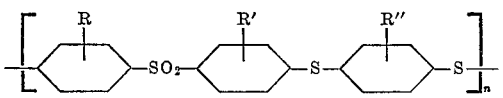

where R, R' and R" represent hydrogen or lower alkyl radical that is 1 to 5 carbon atoms and $n$ is from 50 to 900.

The resins of the invention can be prepared from previously known organic compounds by a novel synthetic route which I have discovered.

A method for the production of the resins of the invention can be diagrammatically represented as follows:

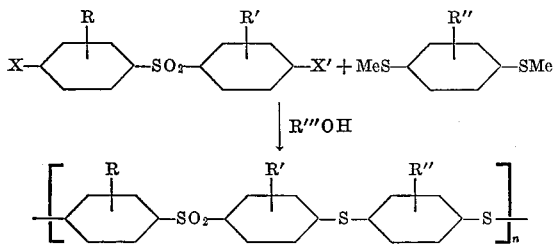

where R, R' and R" and $n$ have the same significance as listed above and where X and X' are chlorine, bromine or iodine, Me is potassium or sodium and R''' is lower alkyl that is 1 to 4 carbon atoms.

The essential step of my process consists of reacting a p,p'-dihalodiphenyl sulfone, such as p,p'-dichlorodiphenyl sulfone, with an alkali metal p-phenylene dimercaptide, such as sodium p-phenylene dimercaptide, in a liquid alcoholic medium. The alcoholic medium can be methanol, ethanol or isopropanol. The halogen atoms of the p,p'-dihalodiphenyl sulfone can be chlorine, bromine or iodine.

The degree of polymerization ($n$ equals 50 to 900) can be varied by introducing into the reaction mixture a material such as p-halophenyl methyl sulfone or p-halophenyl phenyl sulfone. These in effect, by having reactive groups at one end only, terminate the polymer chain at lower values of $n$, i. e., at lower molecular weights.

The resins of this invention may be further reacted with an oxidizing agent such as hydrogen peroxide in glacial acetic acid or by means of potassium permanganate as an added step after the initial polymerization has taken place.

These oxidized resins, poly-p-phenylene sulfones, are particularly useful in applications, such as, coatings, films or molded articles requiring stability at high temperatures.

The resins of this invention are useful as intermediates in the preparation of poly-p-phenylene sulfones and as coating agents.

In order to better understand the invention reference should be had to the following illustrative examples. Parts are given by weight unless otherwise specified.

Example 1

To a solution of 54 parts of sodium methoxide in 800 parts by volume of methanol there is added 71 parts of p-phenylenedithiol (1,4-dithiohydroquinone). p,p' - Dichlorodiphenyl sulfone (143.5 parts) is then added in one portion. The reaction mixture is refluxed for a period of four hours, cooled and poured into 2000 parts by volume of water. The desired product is collected by filtration, washed with water and dried. The product has the formula

where $n$ is 300 to 900.

Example 2

To a solution of 51.5 parts of reagent grade potassium hydroxide in 700 parts by volume of absolute ethanol at room temperature is added 54 parts of p-phenylenedithiol. A mixture consisting of 106 parts of p,p'-dichlorodiphenyl sulfone and 5 parts of p-chlorophenyl phenyl sulfone is then added in one portion. The reaction mixture is refluxed for a period of four hours, cooled, poured into 2000 parts by volume of water, collected by decantation, washed with water and dried. The product has the formula

where $n$ is 50 to 500.

It is obvious that many variations may be made in the products of this invention without departing from the spirit and scope thereof as defined in the appended claims.

I claim:

1. A polymeric condensation product of equal mole amounts of a p,p'-dihalodiphenyl sulfone of the formula

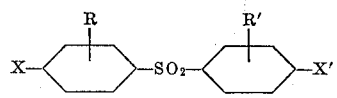

where X and X' are members of the group consisting of chlorine, bromine and iodine and where R and R' are members of the group consisting of hydrogen, methyl and ethyl, with an alkali metal p-phenylene dimercaptide of the formula

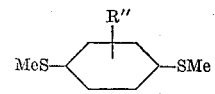

where Me is a member of the group consisting of potassium and sodium and R" is a member of the group consisting of hydrogen, methyl and ethyl.

2. A polymeric condensation product of equal mole amounts of a p,p'-dihalodiphenyl sulfone of the formula

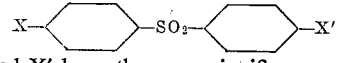

where X and X' have the same significance as in claim 1, with an alkali metal p-phenylene dimercaptide of the formula

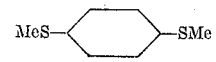

where Me has the same significance as in claim 1.

3. A polymeric condensation product of equal mole amounts of p,p'-dichlorodiphenyl sulfone with sodium p-phenylene dimercaptide.

4. In a process for preparing a polymeric condensation product, the step of refluxing equal mole amounts of a p,p'-dihalodiphenyl sulfone of the formula

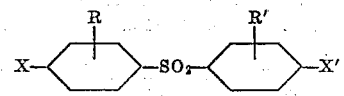

where X and X' are members of the group consisting of chlorine, bromine and iodine and where R and R' are members of the group consisting of hydrogen, methyl and ethyl, with an alkali metal p-phenylene dimercaptide of the formula

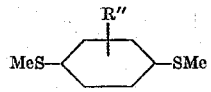

where Me is a member of the group consisting of potassium and sodium and R" is a member of the group consisting of hydrogen, methyl and ethyl, in a liquid alcoholic medium.

5. In a process for preparing a polymeric condensation product, the step of refluxing equal mole amounts of a p,p'-dihalodiphenyl sulfone of the formula

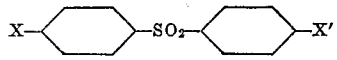

where X and X' have the same significance as in claim 4, with an alkali metal p-phenylene dimercaptide of the formula

where Me has the same significance as in claim 4, in a liquid alcoholic medium.

6. In a process for preparing a polymeric condensation product, the step of refluxing equal mole amounts of p,p'-dichlorodiphenyl sulfone with sodium p-phenylene dimercaptide in n-butanol.

References Cited in the file of this patent
UNITED STATES PATENTS

| | | |
|---|---|---|
| 2,347,182 | Drake | Apr. 25, 1944 |
| 2,505,366 | Schoene | Apr. 25, 1950 |

OTHER REFERENCES

March: "Chemical Abstracts," vol. 47, 1953, page 9548h.